June 25, 1935. W. S. HOLESWORTH 2,006,019
MEASURING DISPENSER
Filed July 10, 1934 2 Sheets-Sheet 1
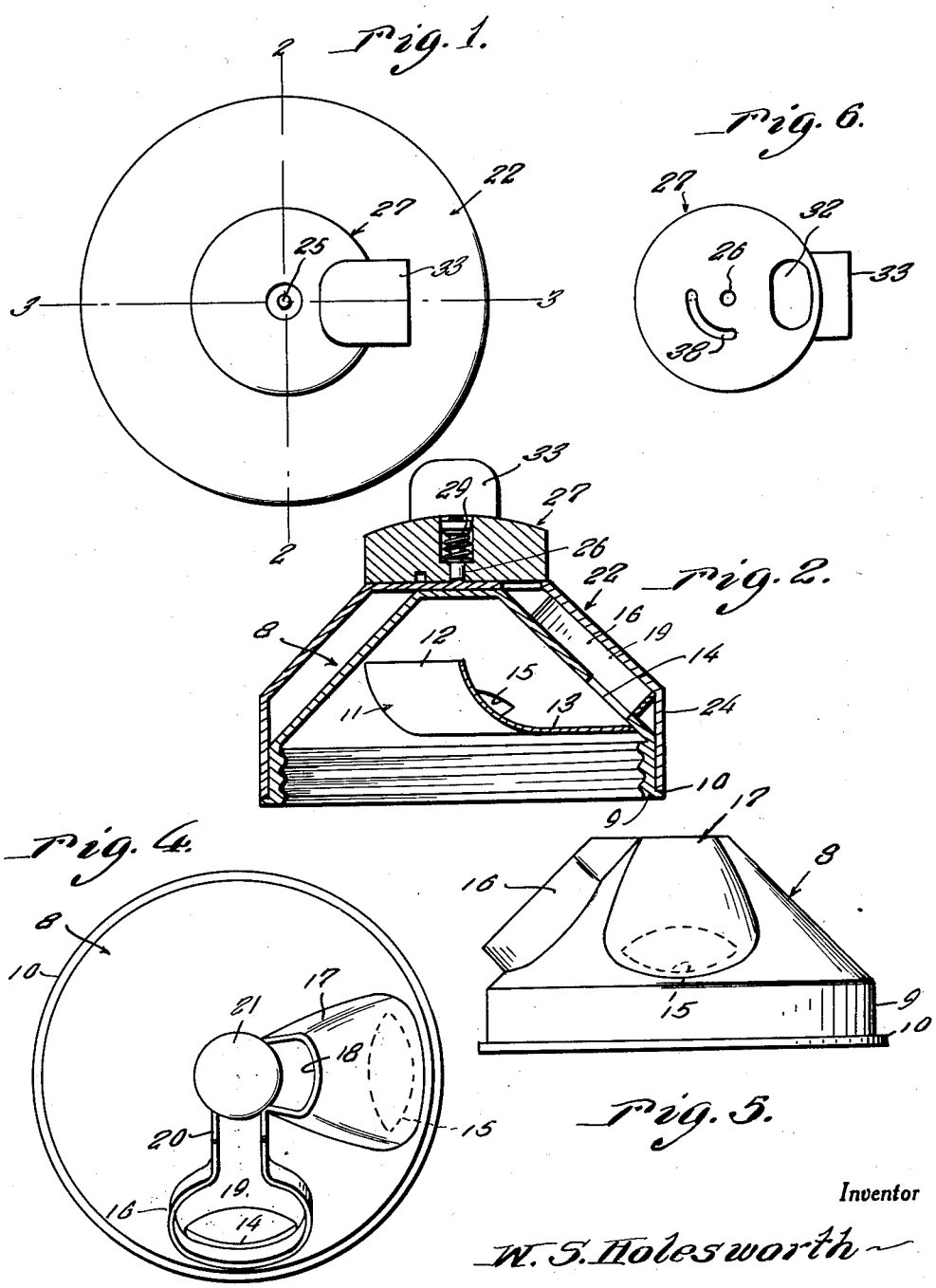
Inventor
W. S. Holesworth
By Clarence A. O'Brien
Attorney June 25, 1935.  W. S. HOLESWORTH  2,006,019
MEASURING DISPENSER
Filed July 10, 1934   2 Sheets-Sheet 2
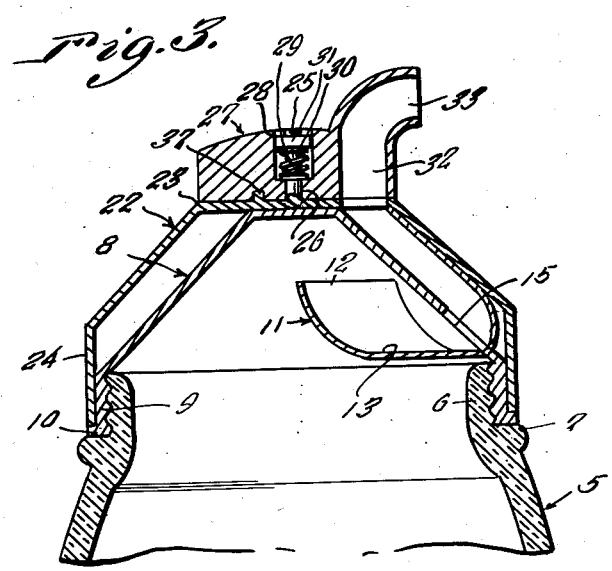
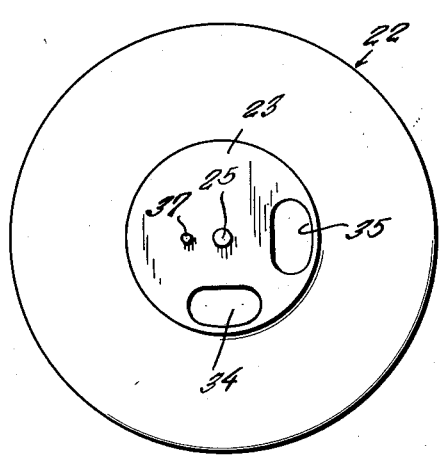 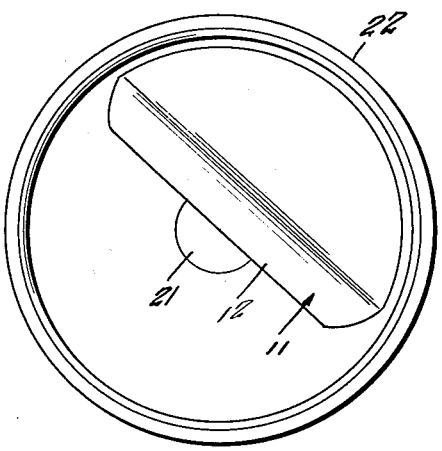
Inventor
W. S. Holesworth
By Clarence A. O'Brien
Attorney Patented June 25, 1935

2,006,019

UNITED STATES PATENT OFFICE 2,006,019

MEASURING DISPENSER

William S. Holesworth, Reno, Nev.

Application July 10, 1934, Serial No. 734,539

3 Claims. (Cl. 221—98)

My invention relates generally to containers arranged to discharge measured quantities of the contents thereof and particularly to a container of this type especially for use with granular substances such as salt and sugar, and an important object of the invention is to provide a simplified and improved dispensing container of the character indicated which is suitable for domestic use and also for use in restaurants.

It is also an important object of my invention to provide a measuring dispensing unit for attaching to the dispensing opening or top of a container, to take the place of the usual perforated cap.

Other objects and advantages of my invention will be apparent from a reading of the following description in connection with the drawings, wherein for purposes of illustration I have shown a preferred embodiment of my invention.

In the drawings:—

Fig. 1 is a top plan of the embodiment.

Fig. 2 is a transverse vertical sectional view taken through Fig. 1 approximately on the line 2—2.

Fig. 3 is a view similar to Fig. 2 but taken on the line 3—3 of Fig. 1.

Fig. 4 is a top plan view of the inner cone.

Fig. 5 is a side elevational view of Fig. 4.

Fig. 6 is a bottom plan view of the adjustable spout.

Fig. 7 is a top plan view of the inner cone with the masking cone or bonnet and the adjustable spout removed.

Fig. 8 is a bottom plan view of Fig. 2.

Referring in detail to the drawings, the numeral 5 refers generally to a glass or other suitable material receptacle, such as a salt cellar or a sugar bowl having the inset exteriorly threaded lip 6 on its upper end defining the shoulder 7 therebelow.

In accordance with the invention, I provide the inner cone generally designated 8 which has the depending interiorly threaded flange 9 having the radially outwardly projecting flange 10 at its lower edge. Above the upper end of the flange 9, there is arranged across one half of the inner cone 8 the scoop 11 whose upper edge 12 is at a level considerably above the upper edge of the flange 9 while the bottom 13 of the scoop is on a level just above the upper edge of the flange 9. The wall of the cone 8 has a pair of circumferentially spaced openings 14, 15 opening onto the floor of the scoop below the upper edge 12 of the scoop. The tops of the openings 14, 15 are below the upper edge 12 of the scoop.

On the exterior of the cone 8 is a banjo-shaped wall 16 forming a measuring receptacle in communication with the opening 14. A tubular fan-shaped receptacle 17 has its wide lower end in communication with the opening 15, the receptacle 17 having an opening 18 at its upper end adapted to co-operate with the dispensing passage of the spout. The upper end of the wall 16 defining the measuring receptacle 19, designated at 20 co-operates with the dispensing passage of the spout. It will be obvious that the radially inner side of the receptacle 17 is constituted by the interior surface of the cone 8; and that the exterior surface of the cone 8 also forms one side of the receptacle 19, the radially outer side of the receptacle 19 being defined by the inner surface of the masking bonnet to be described. The top of the cone 8 is provided with a flat circular top as indicated at 21.

The masking bonnet generally designated 22 is frusto-conical in form, being provided with the flat circular top 23 and the depending cylindrical flange which receives the flange 9 of the inner cone and has its lower edge resting on the radial flange 10 as shown in Figs. 2 and 3. The flat top 23 of the bonnet rests on the flat circular top 21 of the inner cone, and the angulated side walls of the bonnet are approximately parallelly spaced from the angulated walls of the inner cone.

From the center of the top 23 of the bonnet rises a pivot 25 which transverses a bore 26 in a flat cylindrical spout generally designated 27, the bore leading into an enlarged portion 28 wherein a spring 29, a washer 30 and a nut 31 are arranged on the pivot so as to hold the spout 27 frictionally in engagement with the top of the bonnet. A vertical passage 32 eccentrically located in the spout 27 has at its upper end a laterally directed portion 33. The lower end of the passage 32 is adapted to be registered with either one of the dispensing holes 34, 35 which are circumferentially spaced in the top of the bonnet. A pin 37 rising from the top 23 of the bonnet works in an arcuate slot 38 and prevents rotation of the spout 27 except to an extent which will permit registering the spout with either the opening 34 or the opening 35. It will be obvious that the receptacles 17 and 19 are adapted to contain different quantities of the granular contents of the receptacle 5, so that these receptacles 17 and 19 are capable of containing a predetermined quantity of the granular material and to dispense this predetermined quantity through the spout only when the spout is registered therewith and the entire device is inverted.

When the container 5 contains a quantity of the granular material, the device of the invention is loaded by inverting the receptacle that some of the contents thereof falls into the upper part of the inner cone, a portion of the material thus located falling into the scoop 11. Upon angulating the device, a portion of the material in the scoop 11 will divide into separate portions in the receptacles 17 and 19 by passing through the openings 14 and 15. When the device is again inverted, the material within the receptacles 17 and 19 will fall toward their openings 34, 35 and with the passage of the spout registered with but one of these openings and not with the other, the material within the registered receptacle will be dispensed through the spout. If desired, the spring 29 may be so arranged as to keep the spout turned yieldably in a direction which brings it out of registry with one or both of the holes 14, 15.

Although I have shown and described herein a preferred embodiment of my invention, it is to be definitely understood that I do not desire to limit the application of the invention thereto, and any change or changes may be made in materials and in structure and arrangement of parts, within the spirit of the invention and the scope of the subjoined claims.

I claim:—

1. A measuring and dispensing device for attachment to the mouth of a container, such device comprising an inner cup having a scoop therein, an outer cup having a portion radially spaced from the inner chamber, said scoop being in communication with the space between the cups by means of openings in the inner cup communicating with such space, each of said openings leading into corresponding measuring receptacles located in said space, a rotatable spout carried by the second cup and having an opening arranged to be registered in communication with any one of said receptacles.

2. A measuring and dispensing cap for a granular material containing container having a threaded neck, said cap comprising an inner cup having a threaded part connectible to said neck and formed with two circumferentially spaced material passing openings, two wall members on the exterior of said cup defining measuring chambers of different sizes, said chambers surrounding the respective openings and communicating therewith, an outer and rotatable cup surrounding and enclosing said inner cup and having a part rotatably engaged with the exterior of the inner cup, side portions of said outer cup closing the radially outward sides of said measuring chambers, the upper end of said outer cup having discharge openings corresponding to and leading into the upper ends of said chambers, and a rotatable closure on said outer cap and having a spout selectively registrable with either one of said discharge openings and a part arranged for closing one of said discharge openings while said spout is registered with the remaining discharge opening.

3. A measuring and dispensing cap for a granular material containing container having a threaded neck, said cap comprising an inner cup having a threaded part connectible to said neck and formed with two circumferentially spaced material passing openings, two wall members on the exterior of said cup defining measuring chambers of different sizes, said chambers surrounding the respective openings and communicating therewith, an outer and rotatable cup surrounding and enclosing said inner cup and having a part rotatably engaged with the exterior of the radially outward sides of said measuring chambers, the upper end of said outer cup having discharge openings corresponding to and leading into the upper ends of said chambers, and a rotatable closure on said outer cap and having a spout selectively registrable with either one of said discharge openings and a part arranged for closing one of said discharge openings while said spout is registered with the remaining discharge opening, and a scoop mounted on and within said inner cup and extending adjacent to said material passing openings for guiding granular material in said scoop into the two chambers as the container is tilted.

WILLIAM S. HOLESWORTH.